United States Patent
Obaidi (10) Patent No.: US 11,750,276 B2
(45) Date of Patent: Sep. 5, 2023

(54) OPTIMIZING SIGNAL TRANSMISSION HANDOFF VIA SATELLITE BASED CORE NETWORK

(71) Applicant: T-Mobile USA, Inc., Bellevue, WA (US)

(72) Inventor: Ahmad Arash Obaidi, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 159 days.

(21) Appl. No.: 17/383,137

(22) Filed: Jul. 22, 2021

(65) Prior Publication Data

US 2023/0022945 A1    Jan. 26, 2023

(51) Int. Cl.
*H04B 7/00* (2006.01)
*H04B 7/185* (2006.01)

(52) U.S. Cl.
CPC ..... *H04B 7/18515* (2013.01); *H04B 7/18582* (2013.01); *H04B 7/18584* (2013.01)

(58) Field of Classification Search
CPC .............. H04B 7/1851; H04B 7/18541; H04B 7/18563; H04W 36/08; H04W 36/12; H04W 36/14; H04W 36/22; H04W 36/30; H04W 48/18; H04W 76/15; H04W 84/042; H04W 84/06
USPC ........................................................ 370/329
See application file for complete search history.

(56) References Cited

U.S. PATENT DOCUMENTS

| | | | |
|---|---|---|---|
| 9,311,108 B2 | 4/2016 | Cummings | |
| 10,009,093 B2 | 6/2018 | Purkayastha et al. | |
| 10,439,706 B2 | 10/2019 | Michaels | |
| 2018/0092020 A1* | 3/2018 | Torres | H04L 45/021 |
| 2018/0098248 A1* | 4/2018 | Torres | H04W 28/10 |
| 2019/0058672 A1* | 2/2019 | Scott | H04B 7/18513 |
| 2019/0075485 A1* | 3/2019 | Xenakis | H04W 28/20 |
| 2020/0028749 A1 | 1/2020 | Dhandu et al. | |
| 2020/0196209 A1* | 6/2020 | Cui | H04W 36/22 |
| 2020/0259739 A1* | 8/2020 | Kantawala | H04L 41/0668 |
| 2020/0266884 A1* | 8/2020 | Li | H04B 7/18584 |
| 2020/0343968 A1* | 10/2020 | Liu | H04B 7/18554 |
| 2020/0374186 A1* | 11/2020 | Scott | H04B 7/185 |
| 2021/0194808 A1* | 6/2021 | McCormick | H04L 45/48 |
| 2021/0399798 A1* | 12/2021 | Semiao | H04L 5/0044 |
| 2022/0030511 A1* | 1/2022 | Wang | H04L 45/302 |
| 2022/0166497 A1* | 5/2022 | Cantrell | G06Q 20/0655 |
| 2022/0247678 A1* | 8/2022 | Atwal | H04W 24/02 |

OTHER PUBLICATIONS

Agapiou, G. et al., "SDN and NFV for Satellite Infrastructures," IEICE Information and Communication Technology Forum, No. B4-01, Oct. 1, 2016, 4 pages.

\* cited by examiner

*Primary Examiner* — Robert J Lopata
(74) *Attorney, Agent, or Firm* — Han Santos, PLLC (57) ABSTRACT

This present disclosure describes techniques for a satellite core network to relay user plane data to a recipient device. An orchestration controller on the satellite core network is described that is configured to receive an indication that the satellite core network has received user plane data for transmission to a recipient device, detect a constellation of secondary LEO satellites to transmit the user plane data to the recipient device, and select an initial LEO satellite to relay the user plane data to the recipient device.

20 Claims, 9 Drawing Sheets

OPTIMIZING SIGNAL TRANSMISSION HANDOFF VIA SATELLITE BASED CORE NETWORK

BACKGROUND

Geosynchronous satellites have long been used for communication. A geosynchronous satellite is stationary relative to a given location on the Earth. However, because geosynchronous satellites are limited to a geosynchronous orbit (GSO), which has a constant altitude of approximately 36,000 km, the number of satellites that may be placed in the GSO is limited.

As alternatives to geosynchronous satellites, communications system may utilize non-geosynchronous satellites, also known as low earth orbit (LEO) satellites. LEO satellites may operate at altitudes between 400 to 2000 kilometers above the Earth. Unlike geosynchronous satellites, non-geosynchronous satellites are not fixed to a given location on the Earth and can be seen by a terrestrial observer, to move across the sky during their orbit around the Earth. Subsequently, operators deploy a fleet of LEO satellites, also known as a constellation of satellites.

Since LEO satellites are not fixed to a given point on the Earth, telecommunication service providers are required to hand off communication signals from one satellite to another, and from one satellite to a terrestrial base station node. However, inefficiencies in a hand-off of communication signals between an LEO satellite and a terrestrial base station node or user device may cause adverse impacts on the quality of service through latency and packet loss.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1 illustrates

DETAILED DESCRIPTION

This disclosure describes techniques for relaying user plane data from a core network to a recipient device. In one embodiment, user plane data is relayed via a constellation of Low Earth Orbit (LEO) satellites that interact with a terrestrial core network. For example, an orchestration controller is described that is configured to receive an indication that a terrestrial core network has received user plane data for transmission to a recipient device, detect a constellation of Low Earth Orbit (LEO) satellites to transmit the user plane data to the recipient device, select at least a first LEO satellite to receive the user plane data, and transmit the user plane data to the first LEO satellite.

This disclosure further describes an embodiment whereby the user plane data is received at a satellite-based core network and further relayed via a constellation of secondary LEO satellites that interact with the satellite-based core network. An orchestration controller on the satellite core network is described that is configured to receive an indication that the satellite core network has received user plane data for transmission to a recipient device, detect a constellation of secondary LEO satellites to transmit the user plane data to the recipient device, and select an initial LEO satellite to relay the user plane data to the recipient device.

Further, the term "techniques," as used herein, may refer to system(s), method(s), computer-readable instruction(s), module(s), algorithms, hardware logic, and/or operation(s) as permitted by the context described above and through the document.

Figure 1:
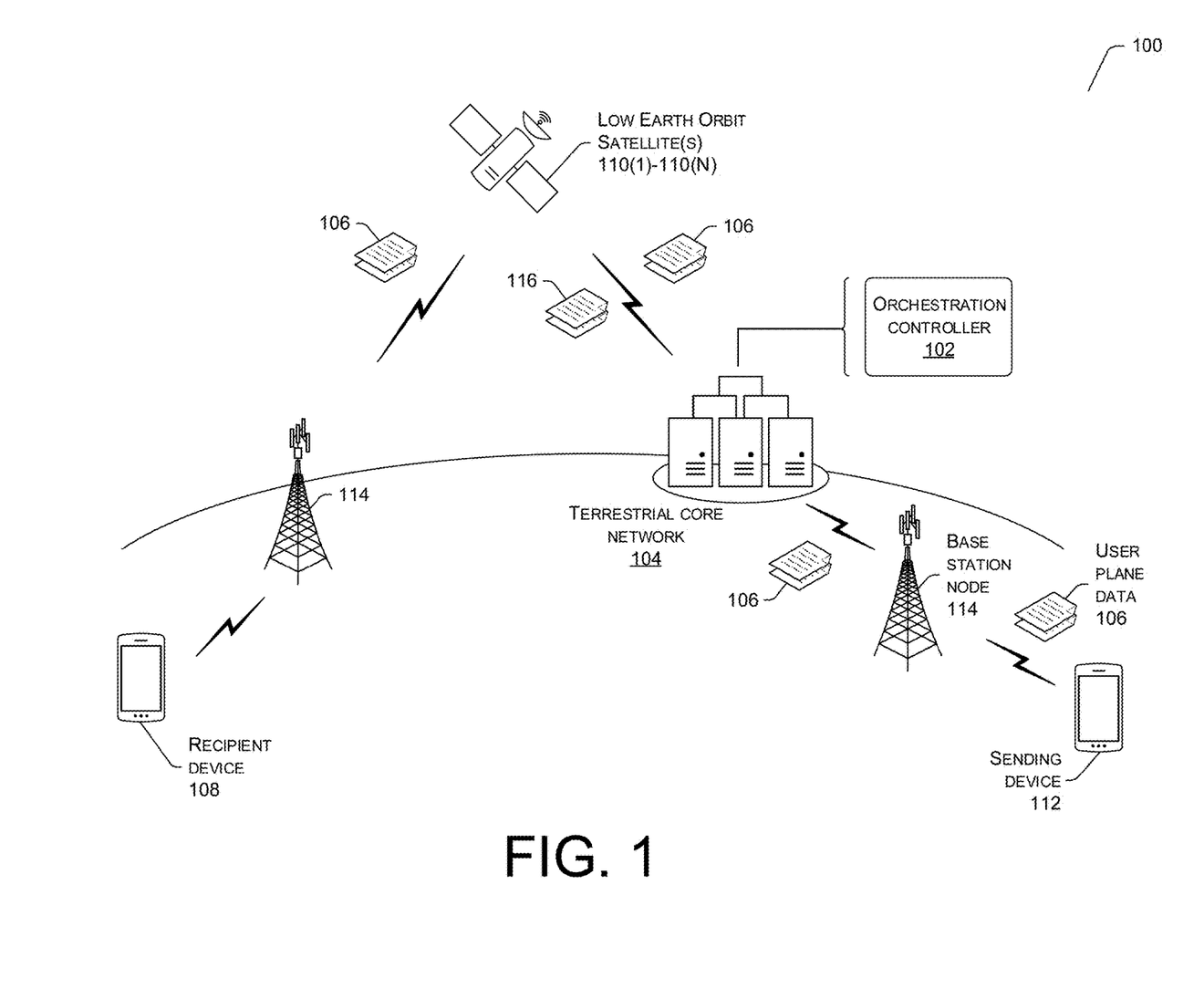
FIG. 1 illustrates a schematic view of an exemplary first computing environment for the operation of an orchestration controller that resides on a terrestrial core network.

FIG. 1 illustrates a schematic view of an exemplary first computing environment for the operation of an orchestration controller that resides on a terrestrial core network. In the illustrated example, the orchestration controller 102 may be configured to interact with the terrestrial core network 104 to facilitate the transmission of user plane data 106 to a recipient device 108 via one or more Low Earth Orbit (LEO) satellites 110(1)-110(N).

The LEO satellite(s) 110(1)-110(N) are orbiting receivers and repeaters that are used to relay information, such as the user plane data 106. The LEO satellite(s) 110(1)-110(N) can receive signals from and transmit signals to a user device, such as a sending device 112 and recipient device 108, provided the user device is within the footprint of the LEO satellite. The footprint of an LEO satellite is defined as the geographic region on the surface of the Earth that is within the range of signals of the satellite. The footprint is usually geographically divided into "beams," through the use of antennas (e.g., the antennas may be used to create fixed, static beams or may be used to create dynamically adjustable beams through beam-forming techniques).

The LEO satellite(s) 110(1)-110(N) may carry multiple radio transceivers and multiple antennas which support multiple and preferably all licensed spectrum in the LEO satellite footprint. The LEO satellite(s) 110(1)-110(N) may form multiple spot beams that dynamically and concurrently beam multiple operating frequencies and communicate with multiple user devices using the same or different mobile network standards. Mobile standards may include 2G, 3G, Long-Term Evolution (LTE), 5G-NR, or a future standard yet to be defined.

In the illustrated example, a sending device 112 may transmit user plane data 106 to the terrestrial core network 104 to deliver to a recipient device 108. The user plane data 106 may be relayed to the terrestrial core network 104 via a base station node 114. The base station node 114 may be responsible for handling voice and data traffic via air interfaces between the terrestrial core network 104 and user devices, such as the sending device 112 and the recipient device 108.

The orchestration controller 102 may intercept an indication that the terrestrial core network 104 has received user plane data 106, from a sending device 112 that is intended for transmission to a recipient device 108. In doing so, the orchestration controller 102 may analyze the user plane data 106 to determine the physical resources required for the LEO satellite(s) 110(1)-110(N) to relay the user plane data to recipient device 108.

Further, the orchestration controller 102 may identify and select a sequence of LEO satellite(s) 110(1)-110(N) that form an actual transmission pathway to the recipient device. The sequence of LEO satellite(s) 110(1)-110(N) may comprise one LEO satellite or a plurality of LEO satellites. Further, selection may be based at least in part on the relative position of each LEO satellite along an ideal transmission pathway between the terrestrial core network 104 and the recipient device 108. The orchestration controller 102 may also account for real-time service congestion at LEO satellites as a criterion for selecting an LEO satellite. Service congestion may be determined as a function of available physical resources on an LEO satellite relative to the physical resource required to relay the user plane data. If an LEO satellite is experiencing service congestion, the service congestion may adversely impact the quality of service associated with transmitting user plane data, through latency or packet loss of the user plane data.

Accordingly, if an LEO satellite is experiencing service congestion, the orchestration controller may select an alternate LEO satellite, despite the alternate LEO satellite likely deviating from the ideal transmission pathway. Even though in some cases, the use of the alternate LEO satellite may increase the length of the transmission pathway, the increased length has a lesser impact on quality of service (e.g., latency and packet loss) relative to relaying the user plane data through an LEO satellite that is experiencing service congestion.

In response to identifying and selecting a sequence of LEO satellite(s) 110(1)-110(N) to form an actual transmission pathway from the terrestrial core network 104 to the recipient device 108, the orchestration controller 102 may generate computer-executable instructions 116 for delivery to the initial LEO satellite. The computer-executable instructions 116 may identify the sequence of LEO satellites that form the actual transmission pathway to the recipient device, and further cause each LEO satellite within the sequence to repeat the user plane data to the next-ordered LEO satellite within the sequence until the user plane data is relayed to the recipient device.

In the illustrated example, the terrestrial core network 104 is a 5G-NR core network. However, one of ordinary skill in the art may appreciate that variations and modifications can be made such that the orchestration controller can operate in accordance with a 2G, 3G, or LTE communication standard.

Moreover, the sending device 112 and recipient device 108 may include any suitable electronic device, such as a television unit, a multimedia streaming device, a cellular phone, a smartphone, a tablet computer, an electronic reader, a media player, a gaming device, a personal computer (PC), a laptop computer, etc. The sending device 112 and recipient device 108 may also include network devices that act as intermediaries with the Internet. In some examples, the sending device 112 and recipient device 108 may include a subscriber identity module (SIM), such as an eSIM, to identify each device to a telecommunication service provider (also referred to herein, as "telecommunications network").

The orchestration controller 102 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interfaces to enable communications with other networked devices, such as the sending device 112 and recipient device 108.

Figure 2A:
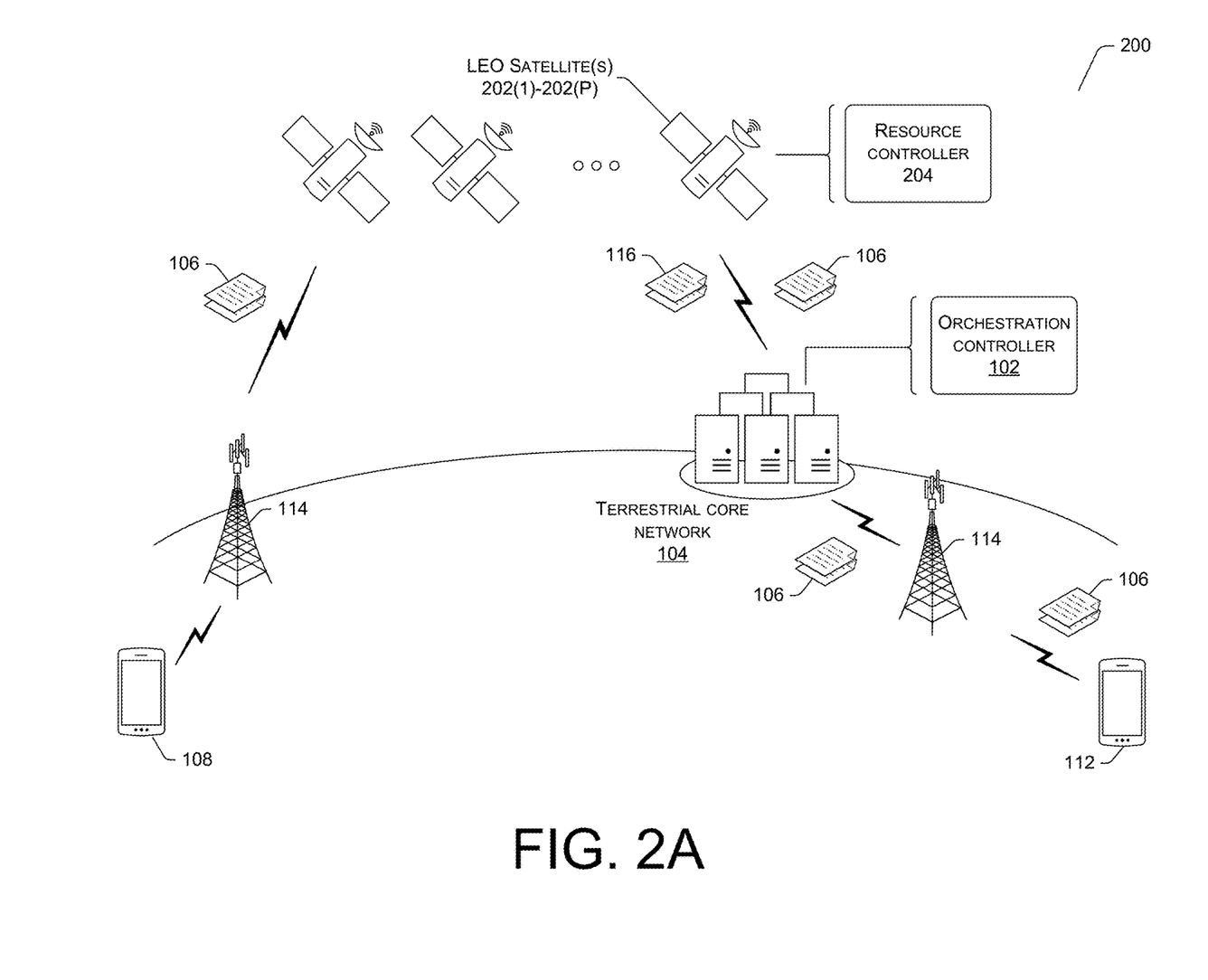
FIG. 2A illustrates a schematic view of an exemplary second computing environment for the operation of an orchestration controller of a core network that interacts with an LEO satellite that includes a resource controller.
Figure 2B:
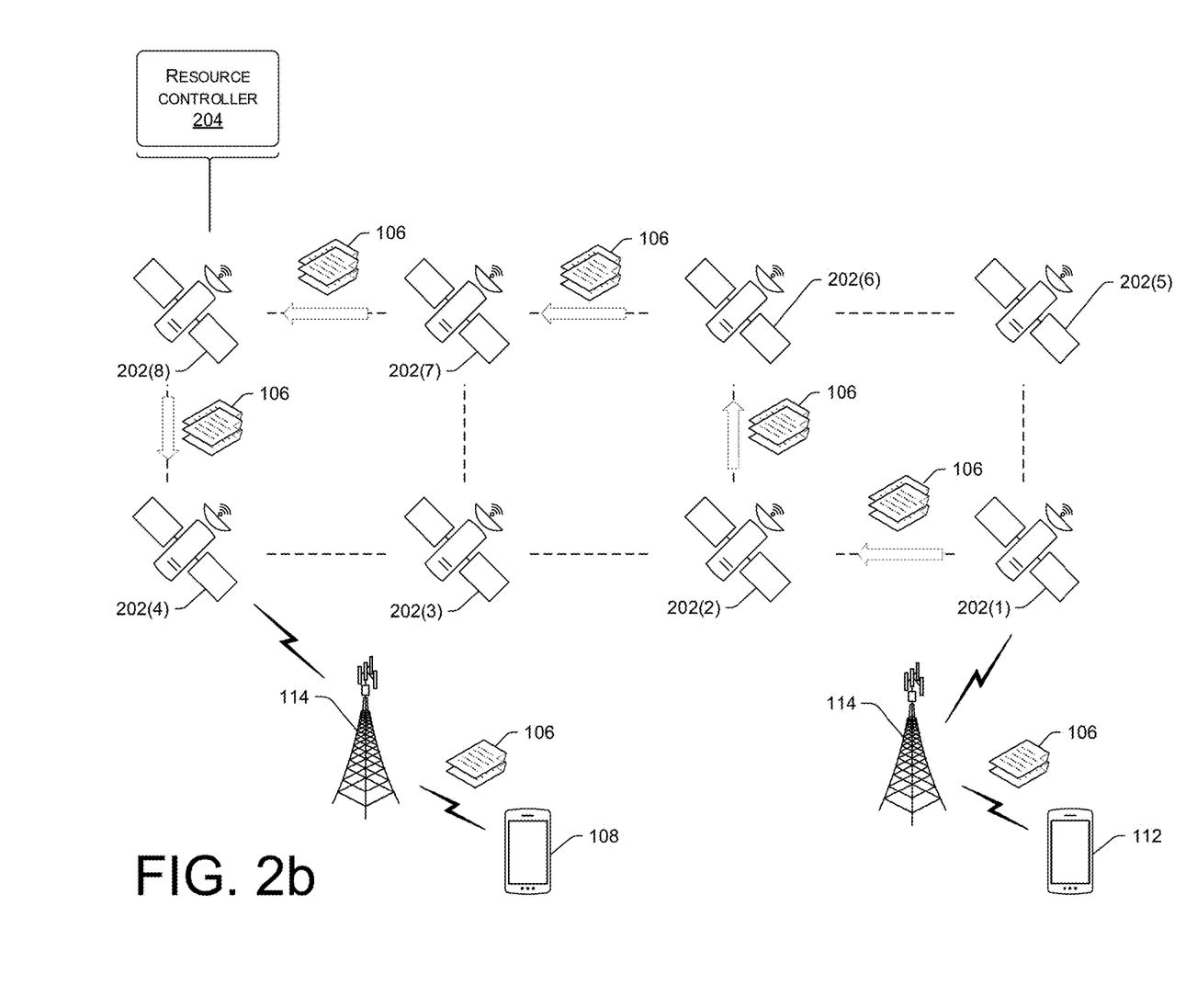
FIG. 2B illustrates a schematic view of an actual transmission pathway of user plane data via a constellation of LEO satellites.

FIG. 2A illustrates a schematic view of an exemplary second computing environment for the operation of an orchestration controller of a core network that interacts with an LEO satellite that includes a resource controller. FIG. 2B illustrates a schematic view of an actual transmission pathway of user plane data via a constellation of LEO satellites.

FIG. 2A includes various details relating to an operation of the orchestration controller 102 that was previously described with reference to FIG. 1. As such, for brevity and ease of description, various details relating to the operation of the orchestration controller 102 as part of the second computing environment 200 have been omitted herein to the extent that the same or similar details have been provided with reference to FIG. 2A.

Referring to FIG. 2A, the orchestration controller 102 that resides in a terrestrial core network 104 may interact with LEO satellite(s) 202(1)-202(P), which each include a resource controller 204. The resource controller 204 may comprise a computing platform that is configured to dynamically determine a transmission pathway for user plane data 106 to a recipient device 108. In part, the resource controller 204 may monitor service congestion at neighboring LEO satellite(s) 202(1)-202(P), and in doing so, select the next best LEO satellite to relay the user plane data. Each subsequent LEO satellite may perform the same action until the user plane data is relayed to the recipient device 108.

In the illustrated example, the orchestration controller 102 may be tasked with delivering the user plane data 106 to an initial LEO satellite. The initial LEO satellite, via its native resource controller 204, may monitor service congestion of LEO satellite(s) 202(1)-202(P) that lie within the transmission pathway, and in doing so, select a next best LEO satellite to relay the user plane data. Each subsequent LEO satellite may perform the same action until the user plane data is relayed to the recipient device.

Referring to FIG. 2B, the LEO satellite(s) 202(1)-202(8) each include a resource controller 204. Accordingly, each of the LEO satellite(s) 202(1)-202(P) are tasked with determining the next best LEO satellite to relay the user plane data 106. In the illustrated example, the LEO satellite 202(1) is tasked with determining whether to relay the user plane data 106 to LEO satellite 202(2) or LEO satellite 202(5). The resource controller 204 that resides in LEO satellite 202(1) may determine an ideal transmission pathway for the user plane data to the recipient device. In this example, the ideal transmission pathway may comprise an ordered sequence of LEO satellites 202(1), 202(2), 202(3), and 202(4), whereby by LEO satellite 202(4) can relay the user plane data 106 to recipient device 108 via a base station node 114.

Once the ideal transmission pathway has been determined, the resource controller 204 that resides in LEO satellite 202(1) may determine the service congestion associated with LEO satellite 202(2), which is the next-ordered LEO satellite on the ideal transmission pathway. In this example, LEO satellite 202(2) may have sufficient resource capacity to relay the user plane data 106. Accordingly, LEO satellite 202(1) may transmit the user plane data 106 to LEO satellite 202(2). The resource controller 204 at LEO satellite 202(2) may perform the same analysis as LEO satellite 202(1) to determine the next-ordered LEO satellite. However, in this example, even though LEO satellite 202(3) is the next-ordered satellite on the ideal transmission pathway, analysis of the service congestion at LEO satellite 202(3) may indicate that LEO satellite 202(6) is a preferred alternative. The selection of LEO satellite 202(6) is premised on the LEO satellite 202(6) having adequate resource capacity to relay the user plane data 106. Even though the selection of LEO satellite 202(6) may increase the length of the transmission pathway, the increased length has a lesser impact on the quality of service (e.g., latency and packet loss) relative to relaying the user plane data through an LEO satellite that is experiencing service congestion.

Accordingly, even though the ideal transmission pathway comprises an ordered sequence of LEO satellites 202(1), 202(2), 202(3), and 202(4), the actual transmission pathway, which accounts for service congestion at LEO satellite 202(3), comprises an ordered sequence of LEO satellite(s) 202(1), 202(2), 202(6), 202(7), 202(8), and 202(4).

Figure 3:
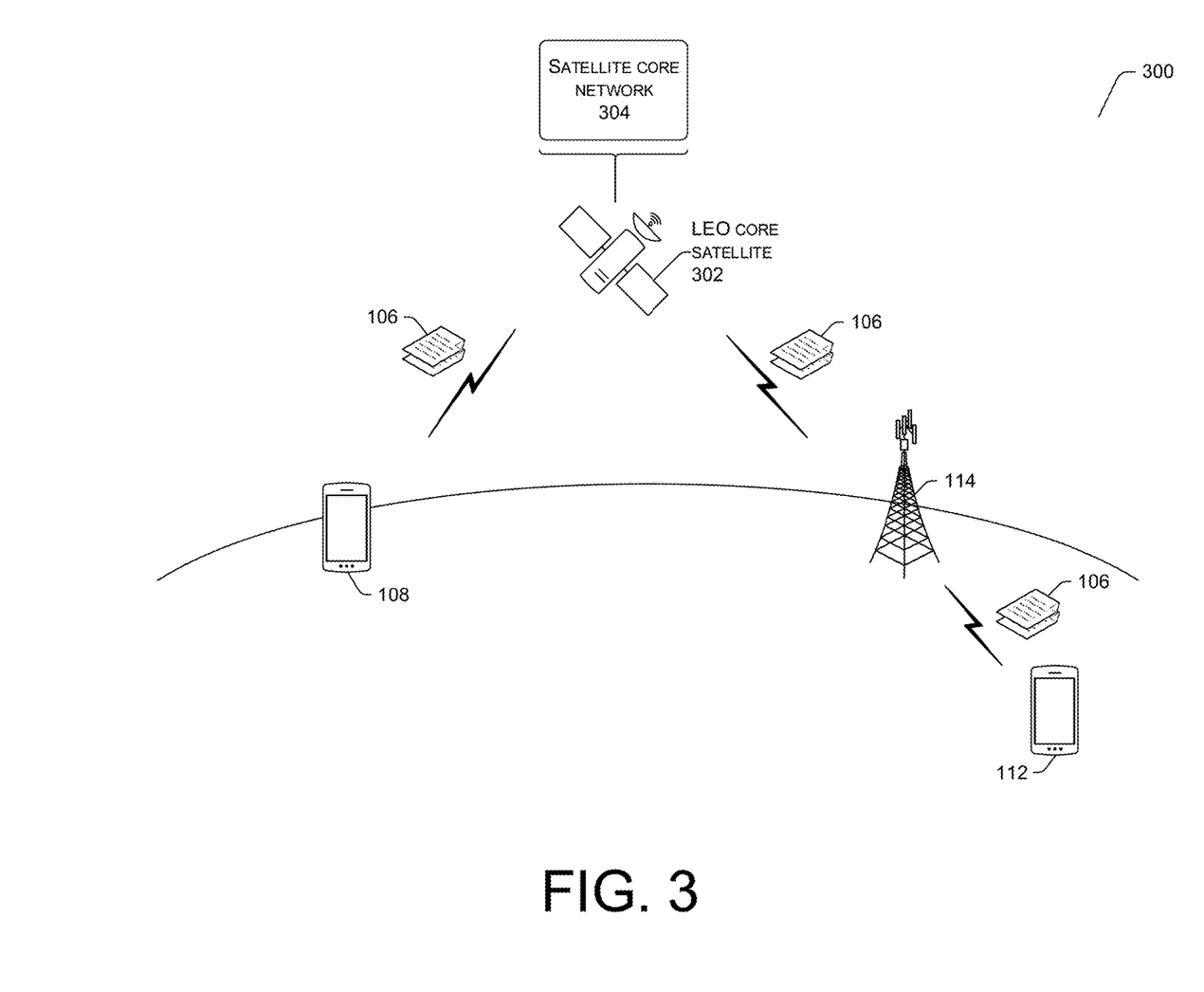
FIG. 3 illustrates a schematic view of an exemplary third computing environment for the operation of a core network that resides on an LEO satellite.

FIG. 3 illustrates a schematic view of an exemplary third computing environment for the operation of a core network that resides on an LEO satellite. FIG. 3 includes various details relating to an operation of the orchestration controller 102 that was previously described with reference to FIG. 1. As such, for brevity and ease of description, various details relating to the operation of the orchestration controller 102 as part of the third computing environment 300 have been omitted herein to the extent that the same or similar details have been provided with reference to FIG. 1.

Referring to FIG. 3, a core LEO satellite 302 may comprise a satellite core network 304 of a telecommunications service provider. The satellite core network 304 may be associated with a mobile standard such as 2G, 3G, LTE, or 5G-NR, or any other suitable future mobile standard yet to be defined. In the illustrated example, the core LEO satellite 302 may receive user plane data 106 from a sending device 112 via a terrestrial base station node 114. In an alternate embodiment, the core LEO satellite 302 may receive the user plane data 106 directly from the sending device 112. In one embodiment, the recipient device 108 may lie within the footprint of the core LEO satellite 302. In this example, the core LEO satellite 302 may transmit the user plane data 106 directly to the recipient device 108. In another embodiment, the core LEO satellite 302 may generate an actual transmission pathway, via one or more secondary LEO satellites, to deliver the user plane data 106 to the recipient device 108.

Figure 4:
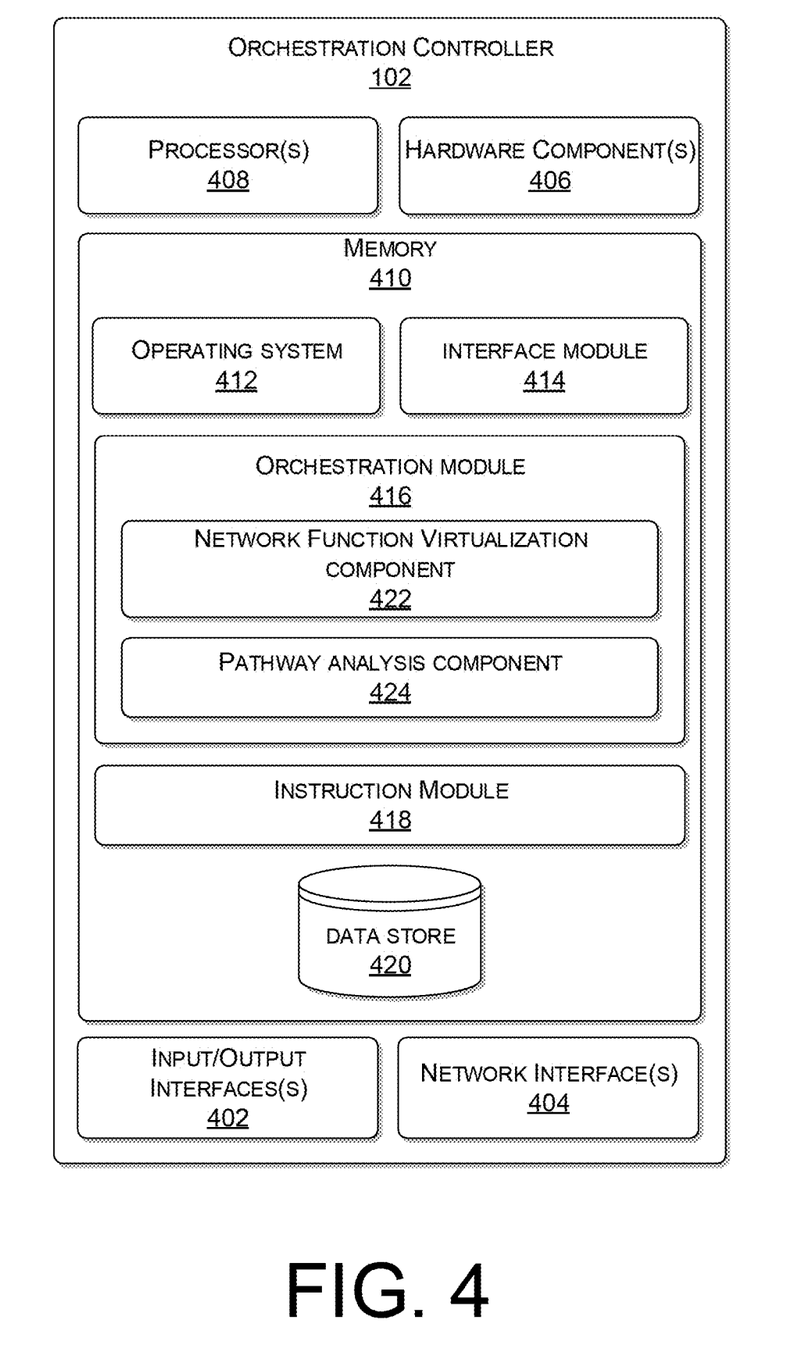
FIG. 4 illustrates various components of an example orchestration controller.

FIG. 4 illustrates various components of an example orchestration controller. The orchestration controller 102 may be configured to interact with a core network, such as a 2G, 3G, LTE, or 5G-NR network. The core network may be a terrestrial core network 104 or a satellite core network 304, as illustrated in FIGS. 1 and 3, respectively. Further, FIG. 4 represents an orchestration controller 102 that is configured to interact with a 5G-NR core network. However, one of ordinary skill in the art may appreciate that variations and modifications can be made such that the orchestration controller can operate in accordance with a 2G, 3G, LTE, or any other suitable future communications standard yet to be defined.

The orchestration controller 102 may include input/output interface(s) 402. The input/output interface(s) 402 may include any suitable type of output interface known in the art, such as a display (e.g., a liquid crystal display), speakers, a vibrating mechanism, or a tactile feedback mechanism. Input/output interface(s) 402 also includes ports for one or more peripheral devices, such as headphones, peripheral speakers, or a peripheral display. Further, the input/output interface(s) 402 may further include a camera, a microphone, a keyboard/keypad, or a touch-sensitive display. A keyboard/keypad may be a push-button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the orchestration controller 102 may include network interface(s) 404. The network interface(s) 404 may include any suitable sort of transceiver known in the art. For example, the network interface(s) 404 may include a radio transceiver that performs the function of transmitting and receiving radio frequency communications via an antenna. Also, the network interface(s) 404 may include a wireless communication transceiver and a near-field antenna for communicating over unlicensed wireless Internet Protocol (IP) networks, such as local wireless data networks and personal area networks (e.g., Bluetooth or near field communication (NFC) networks). Further, the network interface(s) 404 may include wired communication components, such as an Ethernet port or a Universal Serial Bus (USB). Hardware component(s) 406 may include additional hardware interface, data communication hardware, and data storage hardware.

Further, the orchestration controller 102 may include one or more processor(s) 408 that are operably connected to memory 410. In at least one example, the one or more processor(s) 408 may be a central processing unit(s) (CPU), graphics processing unit(s) (GPU), or both a CPU and GPU or any suitable sort of processing unit(s). Each of the one or more processor(s) 408 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution. The one or more processor(s) 408 may also be responsible for executing all computer applications stored in the memory, which can be associated with common types of volatile (RAM) and/or non-volatile (ROM) memory.

In some examples, memory 410 may include system memory, which may be volatile (such as RAM), non-volatile (such as ROM, flash memory, etc.), or some combination of the two. The memory may also include additional data storage devices (removable and/or non-removable) such as, for example, magnetic disks, optical disks, or tape.

The memory 410 may further include non-transitory computer-readable media, such as volatile and nonvolatile, removable and non-removable media implemented in any suitable method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, or any suitable non-transitory medium which can be used to store the desired information.

In the illustrated example, the memory 410 may include an operating system 412, an interface module 414, an orchestration module 416, an instruction module 418, and a data store 420. The operating system 412 may be any suitable operating system capable of managing computer hardware and software resources. The operating system 412 may include an interface layer that enables applications to interface with the input/output interface(s) 402 and the network interface(s) 404.

The interface module 414 may be configured to interact with a core network. The core network may be a terrestrial core network 104 or a satellite core network 304. In each example, the interface module 414 may intercept indications, from a sending device via the core network, of user plane data that is to be sent to a recipient device.

The interface module 414 may further interact with one or more LEO satellites to validate their satellite locations and to further retrieve congestion data. Satellite location data may provide the orchestration controller 102 with data to infer an ideal transmission pathway to the recipient device. Congestion data may support the selection of LEO satellites that make up the actual transmission pathway to the recipient device. Based on congestion data, the actual transmission pathway may differ from the ideal transmission pathway.

Further, the interface module 414 may interact with select LEO satellites to transmit user plane data and computer-executable instructions. The computer-executable instructions may identify, to LEO satellites, the sequence of next-ordered LEO satellites that form the actual transmission pathway to the recipient device. Further, the computer-executable instructions may cause the LEO satellite to repeat the user plane data to the next-ordered LEO satellite until the user plane data is relayed to the recipient device.

The orchestration module 416 may further include a Network Function Virtualization (NFV) component 422 and a pathway analysis component 424. The NFV component 422 is configured to separate network functions of the core network from hardware to create a virtualized network functions (VNF) that can run on the hardware components of the core network. The VNFs may be configured to analyze and process the user plane data for transmission to the recipient device. Further, the VNFs, in part, may determine an LEO processing capacity that is required of each LEO satellite to repeat the user plane data through to the recipient device.

In one embodiment, the NFV component 422 may analyze the VNF processing capacity of each active VNF to process the user plane data. If the VNF processing capacity of an active VNF is greater than or equal to the VNF processing load of the user plane data, the orchestration controller 102 may select the active VNF to process the user plane data. Alternatively, if the VNF processing capacity of all active VNFs is less than the VNF processing load of the user plane data, the NFV component 422 may selectively create an additional VNF instantiation for processing the user plane data. In doing so, the NFV component 422 may generate the additional VNF instantiation to include a processing capacity that is greater than or equal to the processing load of the user plane data.

The pathway analysis component 424 may be configured to employ one or more machine-learning algorithms to infer an ideal transmission pathway between the core network and recipient device. The ideal transmission pathway may be the most direct transmission pathway from the core network to the recipient device. In one embodiment, the pathway analysis component 424 may retrieve, via the interface module 414, orbital location data associated with each LEO satellite between the core network and the recipient device. In doing so, the pathway analysis component 424 may generate the ideal transmission pathway. The ideal transmission pathway may comprise a plurality of LEO satellites that, in sequence, create a data pipeline from the core network to the recipient device. In one embodiment, the ideal transmission pathway may comprise one LEO satellite. In this example, the recipient device may lie within the service footprint of the one LEO satellite. In another embodiment, the ideal transmission pathway may comprise a plurality of LEO satellites, that in aggregate, create the data pipeline.

Further, the pathway analysis component 424 may determine an actual transmission pathway for delivery of the user plane data based at least in part on service congestion data of satellites that make up the ideal transmission pathway. For example, if an LEO satellite on the ideal transmission pathway is experiencing service congestion, the service congestion may adversely impact the quality of service or transmitting user plane data, through latency or packet loss of the user plane data. Accordingly, the pathway analysis component 424 may deviate from the ideal transmission pathway to select an alternate LEO satellite with greater bandwidth to relay the user plane data. Even though in some cases, the use of the alternate LEO satellite may increase the length of the transmission pathway, the increased length has a lesser impact on quality of service (e.g., latency and packet loss) relative to relaying the user plane data through an LEO satellite that is experiencing service congestion.

The pathway analysis component 424 may determine service congestion as a function of available physical resources on the LEO satellite to repeat the user plane data. The pathway analysis component 424 may determine the service congestion of each next-ordered LEO satellite on an ideal transmission pathway. In one embodiment, the pathway analysis component 424 may determine whether the available physical resource of an LEO satellite is greater than or equal to the resources required to relay the user plane data. If the available physical resource is greater than or equal to the resource required, the pathway analysis component 424 may select the LEO satellite to be part of the actual transmission pathway. Next, the pathway analysis component 424 may identify the next-ordered LEO satellite based on the ideal transmission pathway, and further determine service congestion of the next-ordered LEO satellite. The process of analyzing service congestion is repeated until an entire sequence of LEO satellites is formed to make up the actual transmission pathway to the recipient device.

Alternatively, if the pathway analysis component 424 determines that the available physical resource of an LEO satellite is less than the resource required to relay the user plane data, the pathway analysis component 424 may identify an alternate, LEO satellite. In doing so, the pathway analysis component 424 may determine that the alternate LEO satellite has adequate physical resources to process the user plane data. If so, the pathway analysis component 424 may select the alternate LEO satellite to be part of the actual transmission pathway.

By selecting an alternate LEO satellite, the actual transmission pathway has deviated from the ideal transmission pathway. As a result, the pathway analysis component 424 may employ one or more machine-learning algorithms to revise the ideal transmission pathway based at least in part on the selection of the alternate, next-ordered LEO satellite.

In one embodiment, the pathway analysis component 424 may be configured to select the ordered sequence of all LEO satellites in an actual transmission pathway. In this embodiment, the orchestration controller 102 is burdened with selecting each LEO satellite that can potentially be used to form the actual transmission pathway, based on their respective service congestion.

In another embodiment, the pathway analysis component 424 may select the next-ordered LEO satellite in the actual transmission pathway. In this latter embodiment, the pathway analysis component 424 selects an initial LEO satellite based on service congestion and then delegates the task of selecting a next-ordered LEO satellite to the initial LEO satellite. The next-ordered LEO satellite is then tasked with selecting a subsequent next-ordered LEO satellite, and the process is repeated until the user plane data is relayed to the recipient device. By relying on each LEO satellite to identify and select a next-ordered LEO satellite, the processing load that is required to analyze service congestion for an actual transmission pathway is spread across all LEO satellites that make up the actual transmission pathway.

It is noteworthy that this latter embodiment is premised on LEO satellites each comprising a resource controller that can determine service congestion of a next-ordered LEO satellite. If the pathway analysis component 424 determines that the LEO satellites comprise a resource controller, the pathway analysis component 424 may select an initial LEO satellite and delegate selection of the remaining LEO satellites to subsequent LEO satellites. Otherwise, if the LEO satellites do not comprise a resource controller, the pathway analysis component 424 is tasked with selecting the ordered sequence of all LEO satellites that make up the actual transmission pathway.

The instruction module 418 may be configured to generate computer-executable instructions for delivery to an initial LEO satellite. The computer-executable instructions may identify the sequence of LEO satellites that form the actual transmission pathway to the recipient device, and further cause each LEO satellite within the sequence to repeat the user plane data to the next-ordered LEO satellite within the sequence until the user plane data is relayed to the recipient device.

In an alternate embodiment, the computer-executable instructions may identify an initial LEO satellite of an actual transmission pathway to the recipient device, and further cause the initial LEO satellite, within which the resource controller resides, to select a next-ordered LEO satellite that forms part of the actual transmission pathway, and in doing so, transmit the user plane data to the selected next-ordered LEO satellite.

The data store 420 may include historical transmission pathway data that may be used to train one or more machine-learning algorithms and any other suitable data that is pertinent to an operation of the orchestration controller 102.

Also, the orchestration controller 102, via various modules and components, may make use of one or more trained machine-learning algorithms such as supervised learning, unsupervised learning, semi-supervised learning, naive Bayes, Bayesian network, decision trees, neural networks, fuzzy logic models, and/or probabilistic classification models.

Figure 5:
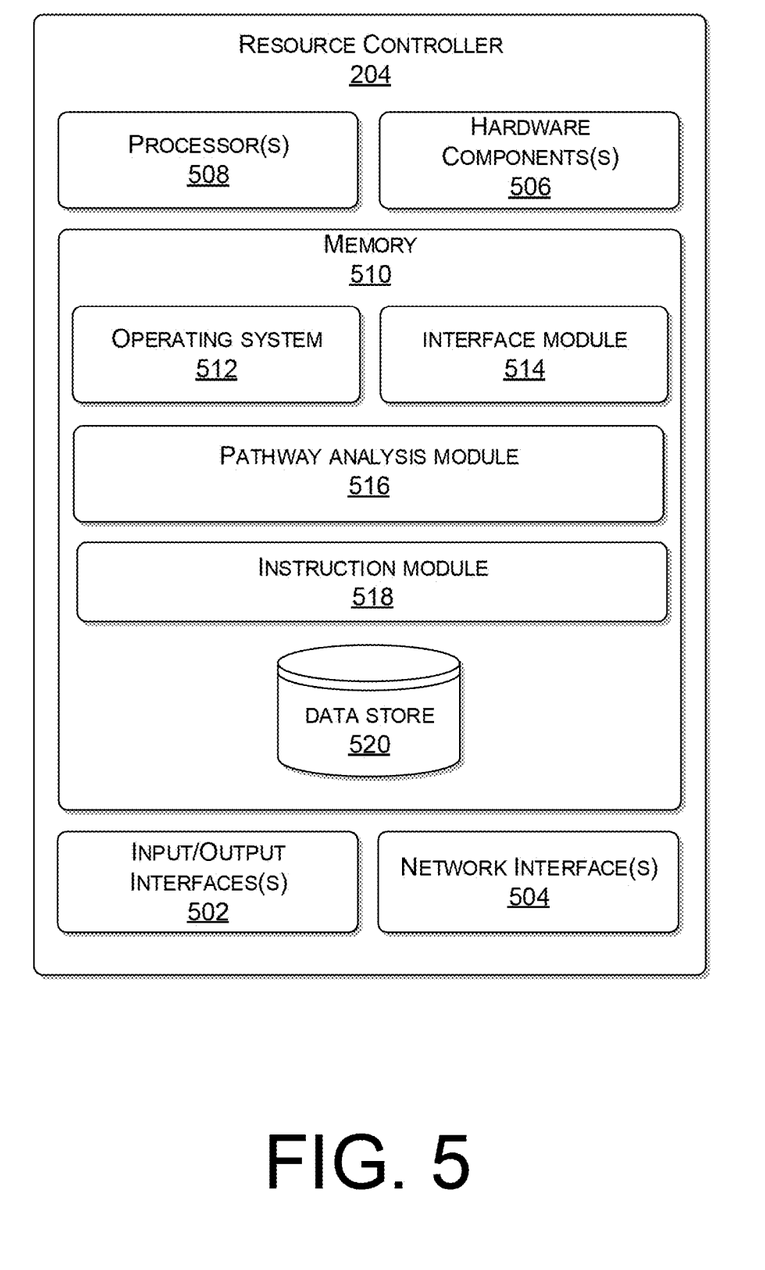
FIG. 5 illustrates various components of an example resource controller.

FIG. 5 illustrates various components of an example resource controller. The resource controller 204 may reside on an LEO satellite and determine a transmission pathway for delivery of user plane data to a recipient device. Unlike an LEO satellite that is tasked with repeating user plane data, an LEO satellite with a resource controller 204 may analyze service congestion of neighboring LEO satellites to select a next-ordered LEO satellite to include as part of an actual transmission pathway to a recipient device.

The resource controller 204 may include input/output interface(s) 502 and network interface(s) 504. The input/output interface(s) 502 may be similar to input/output interface(s) 402, and the network interface(s) 504 may be similar to network interface(s) 404. Hardware component(s) 506 may include additional hardware interface, data communication hardware, and data storage hardware.

The resource controller 204 may include one or more processor(s) 508 that are operably connected to memory 510. The one or more processor(s) 508 may be similar to the one or more processor(s) 408, and the memory 510 may be similar to the memory 410.

The memory 510 may include an operating system 512, an interface module 514, a pathway analysis module 516, an instruction module 518, and a data store 520. The operating system 512 may be any suitable operating system capable of managing computer hardware and software resources. The operating system 512 may include an interface layer that enables applications to interface with the input/output interface(s) 502 and the network interface(s) 504.

The interface module 514 may receive user plane data from a terrestrial or satellite core network for transmission to a recipient device. Also, the interface module 514 may receive user plane data from an LEO satellite for the purpose of relaying the user plane data to a next-ordered LEO satellite or recipient device.

The interface module 514 may interact with one or more neighboring LEO satellites to validate their satellite locations and to further retrieve congestion data. Satellite location data may provide the resource controller 204 with data to infer an ideal transmission pathway to the recipient device. Congestion data may support the selection of LEO satellites that make up the actual transmission pathway to the recipient device. Based on congestion data, the actual transmission pathway may differ from the ideal transmission pathway.

Further, the interface module 514 may interact with select LEO satellites to transmit user plane data and computer-executable instructions. The computer-executable instructions may cause the LEO satellite to transmit the user plane data to a next-ordered LEO satellite on the actual transmission pathway.

The pathway analysis module 516 may be configured to employ one or more machine-learning algorithms to infer an ideal transmission pathway to the recipient device. The ideal transmission pathway may be the most direct transmission pathway from the LEO satellite within which the resource controller 204 resides, to the recipient device. In one embodiment, the pathway analysis module 516 may retrieve, via the interface module 514, orbital location data of other LEO satellites that are positioned between the resource controller 204 and the recipient device. In doing so, the pathway analysis component 424 may generate the ideal transmission pathway.

Further, the pathway analysis module 516 may identify a next-ordered LEO satellite to receive the user plane data, based at least in part on service congestion. Service congestion is determined as a function of available physical resources on the next-ordered LEO satellite to repeat the user plane data. If the next-ordered LEO satellite has an available physical resource that is greater than or equal to the resource required to relay user plane data, the pathway analysis module 516 may select the next-ordered LEO satellite to be part of the actual transmission pathway. In doing so, the pathway analysis module 516 may interact with the instruction module 518 to cause the LEO satellite, within which the resource controller 204 resides, to transmit the user plane data to the selected, next-ordered LEO satellite.

Alternatively, if the next-ordered LEO satellite has an available physical resource that is less than the resource required to relay the user plane data, the pathway analysis module 516 may select an alternate, next-ordered LEO satellite to be part of the actual transmission pathway. Selection of the alternate, next-ordered LEO satellite is premised on determining that the alternate next-ordered LEO satellite has an available physical resource that is greater than or equal to the resource required to relay the user plane data.

The instruction module 518 may be configured to generate computer-executable instructions for delivery to the LEO satellite. The computer-executable instructions may cause the LEO satellite, within which the resource controller 204 resides, to select the next-ordered LEO satellite (or, alternate next-ordered LEO satellite) to form part of the actual transmission pathway, and in doing so, further cause the LEO satellite to transmit the user plane data to the selected next-ordered LEO satellite.

The data store 520 may include historical transmission pathway data that may be used to train one or more machine-learning algorithms and any other suitable data that is pertinent to an operation of the resource controller 204.

Also, the resource controller 204, via various modules and components, may make use of one or more trained machine-learning algorithms such as supervised learning, unsupervised learning, semi-supervised learning, naive Bayes, Bayesian network, decision trees, neural networks, fuzzy logic models, and/or probabilistic classification models.

Figure 6:
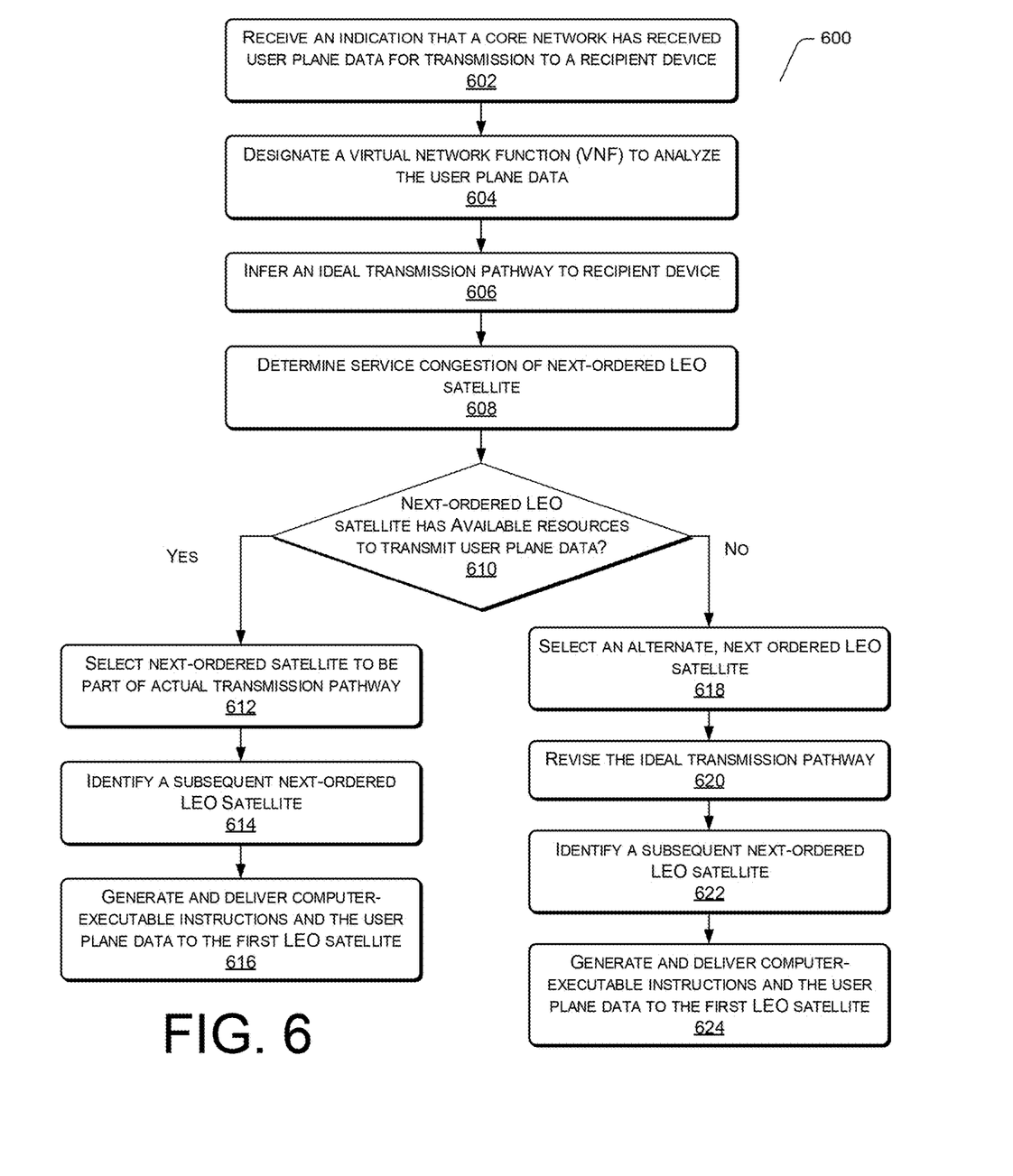
FIG. 6 illustrates a process for an orchestration controller of a terrestrial core network orchestrating the delivery of user plane data to a recipient device via one or more LEO satellites.
Figure 7:
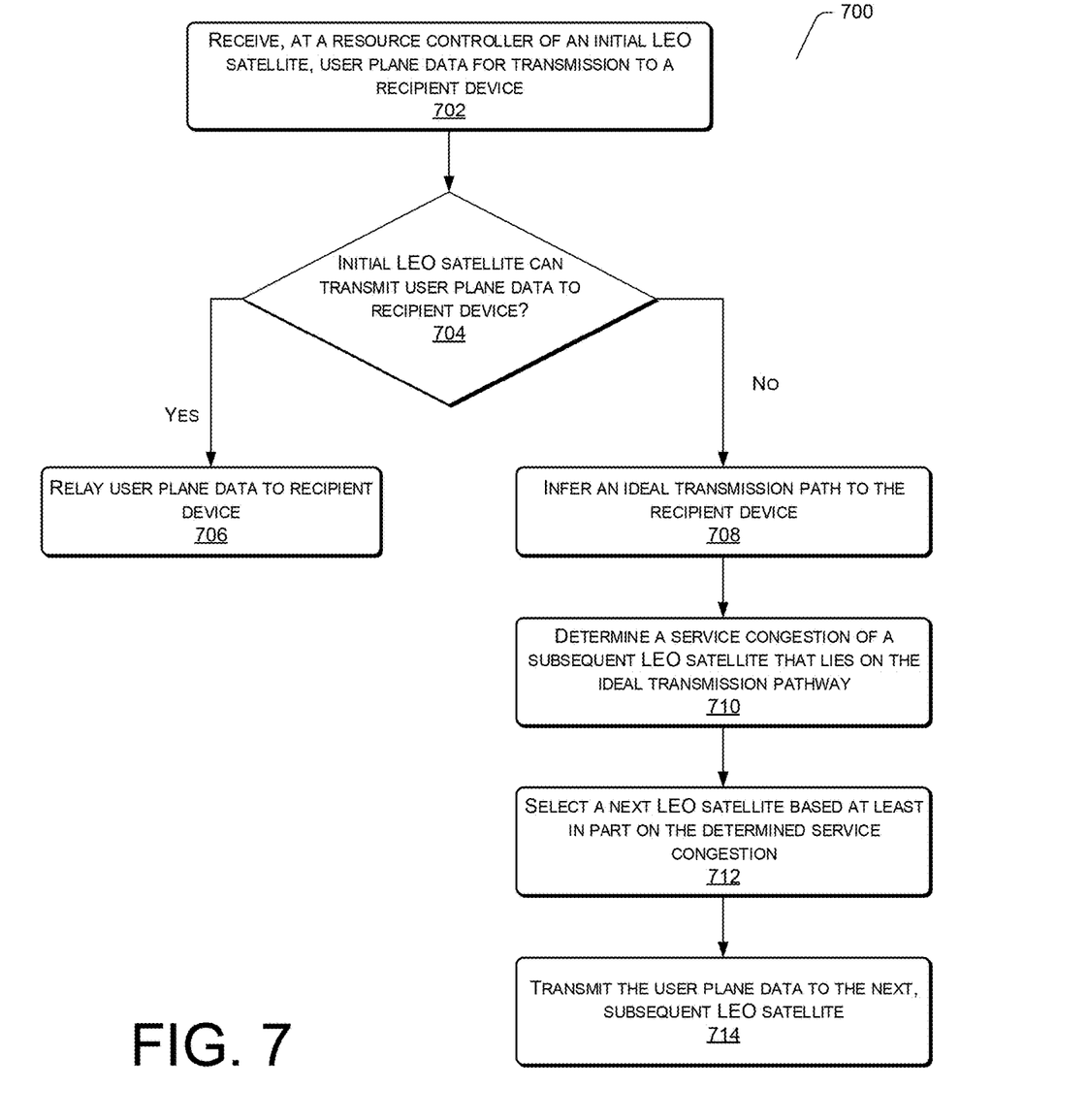
FIG. 7 illustrates a process for a resource controller of an LEO satellite to determine a transmission pathway for delivery of user plane data to a recipient device.
Figure 8:
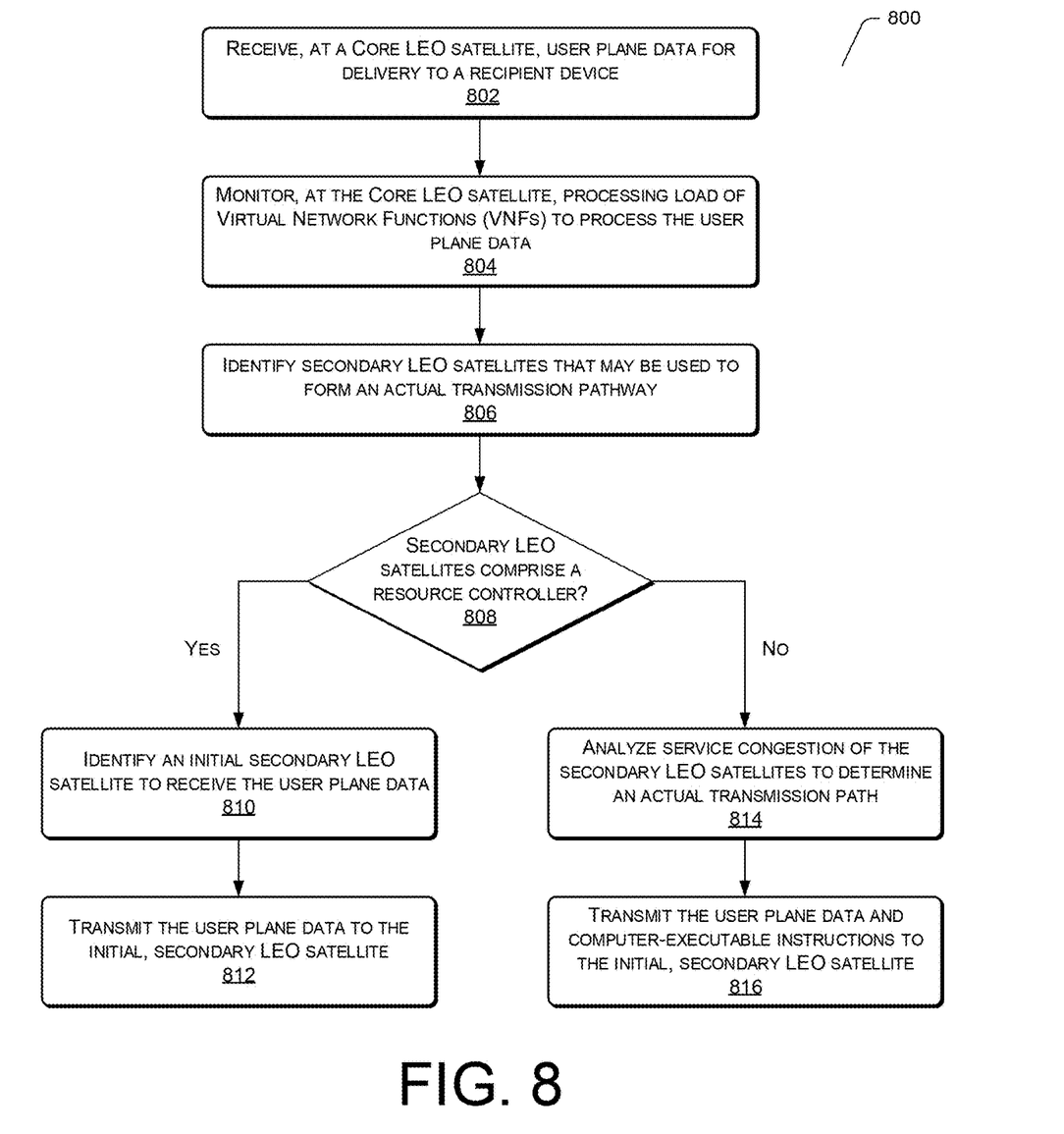
FIG. 8 illustrates a process for a core LEO satellite to orchestrate the delivery of user plane data to the recipient device via one or more subsequent LEO satellites.

FIGS. 6, 7, and 8 present processes 600, 700, and 800 that relate to operations of the Low Earth Orbit Satellites as part of a 5G-NR network. Each of processes 600, 700, and 800 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 600, 700, and 800 are described with reference to the computing environment 100 of FIGS. 1 through 3.

FIG. 6 illustrates a process for an orchestration controller of a terrestrial core network orchestrating the delivery of user plane data to a recipient device via one or more LEO satellites. Process 600 describes an operation of an LEO satellite that acts as a relay and repeater of user plane data that is orchestrated at a terrestrial core network. Further, process 600 is described from the perspective of the orchestration controller 102 that resides within the 5G-NR core.

At 602, the orchestration controller may receive an indication that a core network has received user plane data, from a sending device, for transmission to a recipient device. In this example, the core network may be a 5G-NR core network. However, one of ordinary skill in the art may appreciate that variations and modifications can be made such that the orchestration controller can operate in accordance with a 2G, 3G, or LTE communication standard.

At 604, the orchestration controller may designate a Virtual Network Function (VNF) to analyze the user plane data. In one example, the orchestration controller may determine the current processing capacity of active VNFs. If the current processing capacity of an active VNF is less than the processing load associated with the user plane data, the orchestration controller may select an alternate, active VNF with a processing capacity that is greater than or equal to the processing load of the user plane data. In another embodiment, if the current processing capacity of all active VNFs is less than the processing load of the user plane data, the orchestration controller may selectively create an additional VNF instantiation for processing the user plane data.

At 606, the orchestration controller may employ one or more machine-learning algorithms to infer an ideal transmission pathway between the orchestration controller and the recipient device. In one embodiment, the ideal transmission pathway may comprise one LEO satellite. In this embodiment, the recipient device may lie within the service footprint of the one LEO satellite. In another embodiment, the ideal transmission pathway may comprise a plurality of LEO satellites that in sequence create a data pipeline from the orchestration controller to the recipient device. In this latter embodiment, each LEO satellite within the data pipeline may repeat the user plane data to a subsequent LEO satellite until the user plane data is relayed to the recipient device.

At 608, the orchestration controller may determine service congestion for a next-ordered LEO satellite that lies on the ideal transmission pathway. The next-ordered LEO satellite may comprise the first LEO satellite that receives the user plane data from the terrestrial core network, and each subsequent LEO satellite that receives and repeats the user plane data until the user plane data is relayed to the recipient device. The service congestion may be a function of available physical resources on the first LEO satellite.

At 610, the orchestration controller may determine whether to select the next-ordered LEO satellite to be part of the actual transmission path, based at least in part on the determined service congestion. For example, if the orchestration controller determines that the available physical resource of the next-ordered LEO satellite is greater than or equal to the resources required to relay the user plane data, process 600 may proceed to step 612.

At 612, the orchestration controller may select the next-ordered LEO satellite to be part of the actual transmission pathway. At 614, the orchestration controller may identify a subsequent next-ordered LEO satellite that lies along the ideal transmission pathway. In doing so, process 600 may repeat steps 608 through 610 to determine whether to select the subsequent next-ordered LEO satellite to be part of the actual transmission pathway. Further, steps 608 through 610 are repeated until the entire sequence of LEO satellites is formed to make up the actual transmission pathway to the recipient device.

At 618, the orchestration controller may generate and deliver computer-executable instructions to the first LEO satellite, along with the user plane data. The computer-executable instructions may identify the sequence of LEO satellites that form the actual transmission pathway to the recipient device, and further cause each LEO satellite within the sequence to repeat the user plane data to the next-ordered LEO satellite within the sequence until the user plane data is relayed to the recipient device.

Returning to step 610, if the available physical resource of the next-ordered LEO satellite is less than the resources required to relay the user plane data, process 600 may proceed to step 618. At 618, the orchestration controller may select an alternate, next-ordered LEO satellite with an adequate available physical resource. Selection of an alternate, next-ordered LEO satellite may comprise a repeat of steps 608 through 610.

At 620, the orchestration controller may revise the ideal transmission pathway based at least in part on a selection of the alternate, next-ordered LEO satellite. At 620, the orchestration controller may identify a subsequent, next-ordered LEO satellite that lies along the revised ideal transmission pathway. In doing so, process 600 may repeat steps 608 through 610 to determine whether to select the subsequent, next-ordered LEO satellite to be part of the actual transmission pathway. Further steps 608 through 610 are repeated until the entire sequence of LEO satellites are formed to make up the actual transmission pathway to the recipient device.

At 624, the orchestration controller may generate and deliver computer-executable instructions to the first LEO satellite, along with the user plane data. The computer-executable instructions may identify the sequence of LEO satellites that form the actual transmission pathway to the recipient device, and further cause each LEO satellite within the sequence to repeat the user plane data to the next-ordered LEO satellite within the sequence until the user plane data is relayed to the recipient device.

FIG. 7 illustrates a process for a resource controller of an LEO satellite to determine a transmission pathway for delivery of user plane data to a recipient device. Process 700 describes a resource controller that resides in an LEO satellite that is configured to dynamically determine a transmission pathway for user plane data to a recipient device. In part, the resource controller may monitor service congestion of LEO satellites that lie within the transmission pathway, and in doing so, select the next best LEO satellite to relay the user plane data. Each subsequent LEO satellite may perform the same action until the user plane data is relayed to the recipient device. Process 700 is described from the perspective of the resource controller that resides within an LEO satellite.

At 702, a resource controller of an initial LEO satellite may receive user plane data from a terrestrial core network for transmission to a recipient device. In this embodiment, the initial LEO satellite may include a computing platform within which the resource controller may reside and operate. The user plane data may comprise voice communication, video communication, or streaming multimedia content.

At 704, the resource controller may determine whether the user plane data may be transmitted to the recipient device via the initial LEO satellite. In other words, the resource controller determines whether the recipient device lies within the footprint of the initial LEO satellite. If the resource controller determines that the user plane data may be transmitted directly to the recipient device by the initial LEO satellite, then process 700 may proceed to step 706. At 706, the resource controller of the initial LEO satellite may generate computer-executable instructions that cause the relay the user plane data to the recipient device.

Returning to step 704, if the resource controller determines that the user plane data requires a plurality of LEO satellites for transmission to the recipient device, process 700 may proceed to step 708. At 708, may employ one or more machine-learning algorithms to infer an ideal transmission pathway to the recipient device, via a sequence of LEO satellites. The ideal transmission pathway may be the most direct transmission pathway from the initial LEO satellite to the recipient device.

At 710, the resource controller may determine service congestion of a subsequent LEO satellite that lies on the ideal transmission pathway. Service congestion may be a function of the amount of resource at the subsequent LEO satellite that is available to relay the user plane data. For example, if the resource available at the subsequent LEO satellite is less than the resource required to relay the user plane data, the resource controller may select an alternate subsequent LEO satellite to relay the user plane data. Selection of the alternate subsequent LEO satellite is based at least in part on the amount of resource at the alternate subsequent LEO satellite being greater than or equal to the resources required to relay the user plane data.

At 712, the resource controller may select a next, subsequent LEO satellite to repeat the user plane data, based at least in part on the determined service congestion. In one embodiment, each LEO satellite that receives a relay of the user plane data is tasked with identifying a next LEO satellite-based at least in part on an analysis of service congestion. By relying on each LEO satellite to identify and select a next-ordered LEO satellite, the processing load that is required to analyze service congestion for an actual transmission pathway is spread across all LEO satellites that make up the actual transmission pathway.

In an alternative embodiment, the resource controller of the initial LEO satellite may identify and select all, or substantially all, LEO satellites that form the actual transmission pathway to the recipient device. In this embodiment, the initial LEO satellite is burdened with determining the service congestion for all LEO satellites that can potentially be used to form the actual transmission pathway. It is noteworthy, that even though the initial LEO satellite estimates an ideal transmission pathway, the actual transmission pathway may reflect a less direct route, based on corresponding service congestion of subsequent LEO satellites.

At 714, the resource controller of the initial LEO satellite may generate computer-executable instructions that cause the initial LEO satellite to transmit the user plane data to a next-ordered LEO satellite on the actual transmission pathway. Process steps 710 through 714 are then repeated at the next, subsequent LEO satellites until the user plane data is relayed to the recipient device.

FIG. 8 illustrates a process for a core LEO satellite to orchestrate the delivery of user plane data to the recipient device via one or more subsequent LEO satellites. Process 800 is described from the perspective of a core LEO satellite. The core LEO satellite may comprise a core network of a telecommunication service provider. The core network may be associated with a mobile standard such as 2G, 3G, LTE, 5G-NR, or any other suitable future mobile standard yet to be defined. In an alternative embodiment, it is noteworthy that process 800 may be implemented from a terrestrial core network.

The core LEO satellite may be configured to orchestrate the delivery of user plane data to the recipient device. In this embodiment, the constellation of LEO satellites may comprise a grouping of a core LEO satellite and a plurality of secondary LEO satellites. In one example, the secondary LEO satellites may be configured to relay and repeat user plane data received from the core LEO satellite to the recipient device. In another example, the secondary LEO satellites may include a resource controller that is configured to determine a transmission pathway to the recipient device, based on service congestion of secondary LEO satellites.

At 802, the core LEO satellite may receive user plane data for delivery to a recipient device. The core LEO satellite may receive the user plane data from a user device with a direct line of sight to the core LEO satellite, or via a terrestrial base station node. Additionally, or alternatively, the user plane data may be relayed via a secondary LEO satellite to the core LEO satellite.

At 804, the core LEO satellite may monitor the processing load of active virtual network functions (VNFs) on the core LEO satellite that is earmarked to process the user plane data. The active VNFs, collectively, make up a virtualized environment within which the core network can operate.

If the processing load of an active VNF is greater than or equal to a predetermined processing load threshold, the core LEO satellite may select an alternate active VNF with a processing load that is less than the predetermined processing load threshold. In various examples, the predetermined processing load threshold may be set by an operator of the core LEO satellite or the telecommunications service provider.

Further, if the processing load of all active VNFs is greater than or equal to the predetermined processing load threshold, the core LEO satellite may selectively create an additional VNF instantiation for processing the user plane data.

At 806, the core LEO controller may identify secondary LEO satellites that may be used to form a transmission pathway to the recipient device. In one embodiment, the core LEO controller may employ one or more machine learning algorithms to infer an ideal transmission pathway between the core LEO satellite and the recipient device. In doing so, the core LEO controller may select a grouping of secondary LEO satellites that lie within proximity to the ideal transmission pathway.

At 808, the core LEO controller may determine whether each secondary LEO satellite comprises a resource controller, which can be used to determine service congestion of the next-ordered secondary LEO satellite. If the core LEO controller determines that each secondary LEO satellite comprises a resource controller, process 800 may proceed to step 810.

At 810, the core LEO controller may identify an initial secondary LEO satellite that is to receive the user plane data based on the transmission path inferred from process step 806. Selection of the initial secondary LEO satellite may be further based on the associated service congestion. For example, selection of the initial second LEO satellite may be limited to those that, in part, exhibit service congestion that is less than a predetermined service congestion threshold.

At 812, the core LEO controller may transmit the user plane data to the initial, secondary LEO satellite. At the initial, secondary LEO satellite, the resource controller of the secondary LEO satellite may select a next-ordered secondary LEO satellite that is to be part of the actual transmission pathway, based at least in part on associated service congestion. The next-ordered secondary LEO satellite may then select a subsequent, next-ordered LEO satellite to be part of the actual transmission pathway, and this selection process is repeated until the entire sequence of secondary LEO satellites is formed to make up the actual transmission pathway to the recipient device.

Returning to step 810, if the core LEO controller determines that the secondary LEO satellites do not include a resource controller, process 800 may proceed to step 814. At 814, the core LEO controller may analyze service congestion of the secondary LEO satellites to determine an actual transmission path for the user plane data to the recipient device.

At 816, the core LEO controller may transmit the user plane data to the initial LEO satellite of the actual transmission pathway. The core LEO controller may further include computer-executable instructions that identify, to the initial LEO satellite, the sequence of next-ordered secondary LEO satellites that make up the transmission pathway to the recipient device. Thus, as the user plane data is relayed to the initial LEO satellite, the initial LEO satellite may repeat the user plane data to the next-ordered, secondary LEO satellite until the user plane data is relayed to the recipient device.

Conclusion

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. An orchestration controller, comprising:
one or more processors;
memory coupled to the one or more processors, the memory including one or more modules that are executable by the one or more processors to:
receive an indication that a satellite core network has received user plane data for transmission to a recipient device;
detect a constellation of secondary Low Earth Orbit (LEO) satellites to transmit the user plane data to the recipient device;
determine whether individual LEO satellites of the constellation of secondary LEO satellites include at least one LEO satellite that is each equipped with a corresponding resource controller, the resource controller to determine a transmission pathway to the recipient device; and
in response to determining that the individual LEO satellites include the at least one LEO satellite that is each equipped with the corresponding resource controller, select an initial LEO satellite that is to receive the user plane data, and transmit the user plane data to the initial LEO satellite,
wherein the orchestration controller resides on a core LEO satellite of the satellite core network.

2. The orchestration controller of claim 1, wherein the one or more modules are further executable by the one or more processors to:
in response to determining that the individual secondary LEO satellites do not include at least one LEO satellite that is each equipped with the corresponding resource controller, determine an actual transmission pathway to deliver the user plane data to the recipient device, the actual pathway comprising one or more individual secondary LEO satellites; and
generate computer-executable instructions for delivery to the initial LEO satellite that identifies to the initial LEO satellite, a sequence of next-ordered secondary LEO satellites that make up the actual transmission pathway.

3. The orchestration controller of claim 1, wherein the one or more modules are further executable by the one or more processors to:
infer, via one or more machine-learning algorithms, an ideal transmission pathway to the recipient device, and wherein to identify the initial LEO satellite is based at least in part on the ideal transmission pathway.

4. The orchestration controller of claim 1, wherein the one or more modules are further executable by the one or more processors to:
determine a service congestion of the initial LEO satellite, the service congestion corresponding to a resource capability of the initial LEO satellite to relay the user plane data to the recipient device, and
wherein to select the initial LEO satellite is based at least in part on the resource capability being greater than or equal to the resource required to relay the user plane data.

5. The orchestration controller of claim 1, wherein the one or more modules are further executable by the one or more processors to:
determine a service congestion of a particular LEO satellite, the service congestion corresponding to a resource capability of the particular LEO satellite to relay the user plane data; and
in response to the resource capability of the particular LEO satellite being less than the resource required to relay the user plane data, select an alternate LEO satellite, based at least in part on the resource capability of the alternate LEO satellite is greater than or equal to the resource required to relay the user plane data, and
wherein the alternate LEO satellite corresponds to the initial LEO satellite.

6. The orchestration controller of claim 1, wherein the one or more modules are further executable by the one or more processors to:
infer an ideal transmission pathway between the core LEO satellite and the recipient device;
identify a subset of LEO satellites that lie on the ideal transmission pathway; and
determine an actual transmission pathway between the core network and the recipient device, based at least in part on the ideal transmission pathway and service congestion of the subset of LEO satellites, and
wherein to select the initial LEO satellite is based at least in part on the actual transmission pathway.

7. The orchestration controller of claim 6, wherein the ideal transmission pathway and the actual transmission pathway are different.

8. The orchestration controller of claim 1, wherein the satellite core network corresponds to a 5G-New Radio core network.

9. The orchestration controller of claim 1, wherein the one or more modules are further executable by the one or more processors to:
monitor at the core LEO satellite, processing load of active virtual network functions (VNFs) to process the user plane data;
in response to determining that the processing load of the active VNFs is less than the processing load required to process the user plane data, create an additional instantiation of an active VNF to process the user plane data, the additional instantiation of the active VNF to have a processing load that is greater than or equal to the processing load of the user plane data.

10. A computer-implemented method, comprising:
under control of one or more processors:
receiving an indication that a satellite core network has received user plane data for transmission to a recipient device;
detecting a constellation of secondary LEO satellites to transmit the user plane data to the recipient device;
determining whether individual LEO satellites of the constellation of secondary LEO satellites include at least one LEO satellite that is each equipped with a corresponding resource controller, the resource controller to determine a transmission pathway to the recipient device; and
in response to determining that the individual LEO satellites include the at least one LEO satellite that is each equipped with the corresponding resource controller, selecting an initial LEO satellite that is to receive the user plane data, and transmitting the user plane data to the initial LEO satellite.

11. The computer-implemented method of claim 10, further comprising:
in response to determining that the individual secondary LEO satellites do not include the at least one LEO satellite that is each equipped with the corresponding resource controller, determining an actual transmission pathway to deliver the user plane data to the recipient device, the actual pathway comprising one or more individual secondary LEO satellites; and
generating computer-executable instructions for delivery to the initial LEO satellite that identifies to the initial LEO satellite, a sequence of next-ordered secondary LEO satellites that make up the actual transmission pathway.

12. The computer-implemented method of claim 10, further comprising:
inferring, via one or more machine-learning algorithms, an ideal transmission pathway to the recipient device, and
wherein to identify the initial LEO satellite is based at least in part on the ideal transmission pathway.

13. The computer-implemented method of claim 10, further comprising:
determining a service congestion of the initial LEO satellite, the service congestion corresponding to a resource capability of the initial LEO satellite to relay the user plane data to the recipient device, and
wherein to select the initial LEO satellite is based at least in part on the resource capability being greater than or equal to the resource required to relay the user plane data.

14. The computer-implemented method of claim 10, further comprising:
determining a service congestion of a particular LEO satellite, the service congestion corresponding to a resource capability of the particular LEO satellite to relay the user plane data; and
in response to the resource capability of the particular LEO satellite being less than the resource required to relay the user plane data, selecting an alternate LEO satellite, based at least in part on the resource capability of the alternate LEO satellite is greater than or equal to the resource required to relay the user plane data, and
wherein the alternate LEO satellite corresponds to the initial LEO satellite.

15. One or more non-transitory computer-readable media collectively storing computer-executable instructions that upon execution cause one or more processors to perform acts comprising:
receiving an indication that a satellite core network has received user plane data for transmission to a recipient device;
detecting a constellation of secondary LEO satellites to transmit the user plane data to the recipient device;

determining whether individual LEO satellites of the constellation of secondary LEO satellites include at least one LEO satellite that is each equipped with a corresponding resource controller, the resource controller to determine a transmission pathway to the recipient device; and in response to determining that the individual LEO satellites include the at least one LEO satellite that is each equipped with the corresponding resource controller, selecting an initial LEO satellite that is to receive the user plane data, and transmitting the user plane data to the initial LEO satellite.

16. The one or more non-transitory computer-readable media of claim 15, wherein acts further comprise:

inferring an ideal transmission pathway between the core LEO satellite and the recipient device;

identifying a subset of LEO satellites that lie on the ideal transmission pathway; and determining an actual transmission pathway between the core network and the recipient device, based at least in part on the ideal transmission pathway and service congestion of the subset of LEO satellites, and wherein to select the initial LEO satellite is based at least in part on the actual transmission pathway.

17. The one or more non-transitory computer-readable media of claim 16, wherein the ideal transmission pathway and the actual transmission pathway are different.

18. The one or more non-transitory computer-readable media of claim 15, wherein acts further comprise:

inferring, via one or more machine-learning algorithms, an ideal transmission pathway to the recipient device, and wherein to identify the initial LEO satellite is based at least in part on the ideal transmission pathway.

19. The one or more non-transitory computer-readable media of claim 15, wherein acts further comprise:

determining a service congestion of a particular LEO satellite, the service congestion corresponding to a resource capability of the particular LEO satellite to relay the user plane data; and in response to the resource capability of the particular LEO satellite being less than the resource required to relay the user plane data, selecting an alternate LEO satellite, based at least in part on the resource capability of the alternate LEO satellite is greater than or equal to the resource required to relay the user plane data, and wherein the alternate LEO satellite corresponds to the initial LEO satellite.

20. The one or more non-transitory computer-readable media of claim 15, wherein the satellite core network corresponds to a 5G-New Radio core network.

* * * * *